United States Patent
Halfer et al.

(10) Patent No.: US 12,454,333 B2
(45) Date of Patent: Oct. 28, 2025

(54) BELT DRIVE FOR DRIVING A MOTOR VEHICLE, IN PARTICULAR A MOTORCYCLE, AND MOTOR VEHICLE, IN PARTICULAR A MOTORCYCLE

(71) Applicant: Bayerische Motoren Werke Aktiengesellschaft, Munich (DE)

(72) Inventors: Matthias Halfer, Munich (DE); Franz Wimmer, Spatzenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/701,659

(22) PCT Filed: Dec. 12, 2022

(86) PCT No.: PCT/EP2022/085381
§ 371 (c)(1),
(2) Date: Apr. 16, 2024

(87) PCT Pub. No.: WO2023/134935
PCT Pub. Date: Jul. 20, 2023

(65) Prior Publication Data
US 2025/0242888 A1    Jul. 31, 2025

(30) Foreign Application Priority Data
Jan. 11, 2022  (DE) ...................... 10 2022 100 471.6

(51) Int. Cl.
*B62M 9/16* (2006.01)
(52) U.S. Cl.
CPC .................... *B62M 9/16* (2013.01)

(58) Field of Classification Search
CPC ..... F16H 2007/0874; F16H 2007/0893; F16H 7/1281; F16H 2007/081; F16H 7/08; F16H 2007/0865
(Continued)

(56) References Cited

U.S. PATENT DOCUMENTS

| 611,170 | A | * | 9/1898 | Howard | ................ F16H 7/1281 |
| | | | | | 474/134 |
| 976,115 | A | * | 11/1910 | Bard | ......................... F16H 7/08 |
| | | | | | 180/443 |

(Continued)

FOREIGN PATENT DOCUMENTS

| DE | 196 31 507 A1 | 2/1998 |
| DE | 198 08 129 C1 | 4/1999 |

(Continued)

OTHER PUBLICATIONS

International Search Report (PCT/ISA/210) issued in PCT Application No. PCT/EP2022/085381 dated Jan. 27, 2023 with English translation (5 pages).
(Continued)

Primary Examiner — Henry Y Liu
(74) Attorney, Agent, or Firm — Crowell & Moring LLP

(57) ABSTRACT

A belt drive for driving a motor vehicle, comprising a first belt pulley which can be driven by a drive motor of the motor vehicle, a belt which at least partly wraps around the first belt pulley and can thus be driven by the first belt pulley, a second belt pulley which is at least partly wrapped by the belt and can thus be driven by the belt, whereby a vehicle wheel of the motor vehicle, and thus the motor vehicle, can be driven by the belt drive via the second belt pulley, and at least one damping element which directly contacts one strand of the belt in order to dampen vibrations of the strand.

9 Claims, 2 Drawing Sheets

(58) Field of Classification Search
USPC .................................... 474/133, 134, 135
See application file for complete search history.

(56) References Cited

U.S. PATENT DOCUMENTS

| | | | | |
|---|---|---|---|---|
| 3,437,162 A * | 4/1969 | Cole | ................ | B62M 7/00 474/69 |
| 3,811,332 A * | 5/1974 | Brown | ................ | F16H 7/08 474/111 |
| 3,817,114 A * | 6/1974 | Klee | ................ | F16H 7/1281 474/134 |
| 3,819,002 A * | 6/1974 | Heathwaite | ................ | F16H 7/14 180/227 |
| 3,834,246 A * | 9/1974 | McGilp | ................ | F16H 7/1281 474/135 |
| 3,838,606 A * | 10/1974 | Scalise | ................ | B62M 9/16 474/111 |
| 4,034,821 A * | 7/1977 | Stoddard | ................ | B62M 9/16 474/134 |
| 4,036,069 A * | 7/1977 | Clark | ................ | B62M 9/16 474/135 |
| 4,069,719 A * | 1/1978 | Cancilla | ................ | B62M 9/16 474/134 |
| 4,141,245 A * | 2/1979 | Brandstetter | ................ | G01L 5/107 474/134 |
| 4,299,582 A * | 11/1981 | Leitner | ................ | B62M 9/16 474/111 |
| 4,416,647 A * | 11/1983 | White, Jr. | ................ | F16H 7/1281 474/134 |
| 4,479,660 A * | 10/1984 | Pattison | ................ | B62M 23/00 474/134 |
| 4,511,348 A * | 4/1985 | Witdoek | ................ | F16H 7/12 474/134 |
| 4,557,707 A * | 12/1985 | Thomey | ................ | F16H 7/1218 474/135 |
| 4,583,962 A * | 4/1986 | Bytzek | ................ | F16H 7/1218 474/135 |
| 4,650,026 A * | 3/1987 | Shiraishi | ................ | B62K 11/00 180/230 |
| 4,705,494 A * | 11/1987 | Gibson | ................ | F16H 7/18 474/148 |
| 5,221,236 A * | 6/1993 | Raymer | ................ | B62M 9/16 474/134 |
| 5,282,517 A * | 2/1994 | Prince | ................ | B62K 25/26 180/219 |
| 5,524,725 A * | 6/1996 | Schantzen | ................ | F16H 7/08 474/111 |
| 5,857,538 A * | 1/1999 | Chambers | ................ | B62K 25/283 180/312 |
| 5,908,078 A * | 6/1999 | Belil Creixell | ................ | B62K 25/16 280/285 |
| 5,957,794 A * | 9/1999 | Kerr | ................ | B62M 9/04 474/122 |
| 6,167,686 B1 * | 1/2001 | Becker | ................ | F16H 7/1281 56/17.3 |
| 6,406,393 B1 * | 6/2002 | Chen | ................ | F16H 7/1281 474/135 |
| 6,488,602 B1 * | 12/2002 | Ebert | ................ | F16H 7/1209 474/101 |
| 6,609,989 B2 * | 8/2003 | Bogner | ................ | F02B 67/06 474/134 |
| 6,689,001 B2 * | 2/2004 | Oliver | ................ | F16H 7/1281 474/134 |
| 6,857,978 B2 * | 2/2005 | Polster | ................ | F16H 7/1209 474/134 |
| 6,866,112 B2 * | 3/2005 | Hoechst | ................ | B62M 9/16 180/231 |
| 6,942,589 B2 * | 9/2005 | Rogers | ................ | F16H 7/1209 474/84 |
| 7,004,865 B2 * | 2/2006 | Berndt | ................ | F16H 7/129 474/135 |
| 7,367,908 B2 * | 5/2008 | Lemberger | ................ | F16H 7/1218 474/138 |
| 7,468,013 B2 * | 12/2008 | Di Giacomo | ................ | F02B 67/06 474/134 |
| 7,479,078 B2 * | 1/2009 | Joslyn | ................ | F16H 7/1281 474/133 |
| 7,955,205 B2 * | 6/2011 | Urabe | ................ | B62M 9/16 474/80 |
| 8,602,930 B2 * | 12/2013 | Deneszczuk | ................ | F16H 7/14 474/135 |
| 9,133,762 B2 * | 9/2015 | Maguire | ................ | F02B 67/06 |
| 9,976,634 B2 * | 5/2018 | Leucht | ................ | F02B 67/06 |
| 10,028,436 B2 * | 7/2018 | Ricketts | ................ | A01D 45/023 |
| 10,066,708 B2 * | 9/2018 | Basile | ................ | F16H 7/1281 |
| 10,634,110 B2 * | 4/2020 | Allard | ................ | F02P 5/16 |
| 10,962,092 B2 * | 3/2021 | Liu | ................ | F16H 7/10 |
| 11,131,367 B2 * | 9/2021 | Wu | ................ | F16H 7/12 |
| 11,142,284 B2 * | 10/2021 | Lund | ................ | B62M 6/70 |
| 11,333,223 B2 * | 5/2022 | Koppeser | ................ | F16H 7/08 |
| 11,873,060 B2 * | 1/2024 | Lin | ................ | F16H 7/129 |
| 11,898,634 B1 * | 2/2024 | Nelson | ................ | F16H 7/0838 |
| 11,975,793 B2 * | 5/2024 | Halfer | ................ | F16H 7/08 |
| 2002/0043416 A1 | 4/2002 | Hoechst | ................ | B62M 9/16 180/231 |
| 2003/0224889 A1 * | 12/2003 | Luh | ................ | F16H 7/1281 474/134 |
| 2004/0072643 A1 * | 4/2004 | Berndt | ................ | F16H 7/129 474/135 |
| 2004/0171448 A1 * | 9/2004 | Lemberger | ................ | F16H 7/1218 474/135 |
| 2005/0181901 A1 * | 8/2005 | Shin | ................ | F16H 7/1218 474/134 |
| 2011/0070985 A1 * | 3/2011 | Deneszczuk | ................ | F16H 7/14 474/135 |
| 2011/0070986 A1 * | 3/2011 | Maguire | ................ | F16H 7/1281 474/135 |
| 2012/0160630 A1 * | 6/2012 | Cannaverde | ................ | E06B 9/90 160/321 |
| 2014/0357437 A1 * | 12/2014 | Hara | ................ | B62M 9/16 474/113 |
| 2017/0307060 A1 * | 10/2017 | Klein | ................ | F16H 57/01 |
| 2019/0071286 A1 * | 3/2019 | Dong | ................ | B66B 23/04 |
| 2019/0301420 A1 * | 10/2019 | Allard | ................ | F02P 5/16 |
| 2022/0055713 A1 * | 2/2022 | Halfer | ................ | B62K 11/00 |

FOREIGN PATENT DOCUMENTS

| | | |
|---|---|---|
| DE | 10 2010 010 834 A1 | 9/2011 |
| DE | 10 2018 215 451 A1 | 3/2020 |
| EP | 1 437 528 B1 | 3/2010 |
| EP | 1 369 622 B1 | 4/2010 |
| WO | WO 2015/036217 A1 | 3/2015 |

OTHER PUBLICATIONS

German-language Written Opinion (PCT/ISA/237) issued in PCT Application No. PCT/EP2022/085381 dated Jan. 27, 2023 with English translation (9 pages).

German-language Search Report issued in German Application No. 10 2022 100 471.6 dated Oct. 24, 2022 with partial English translation (10 pages).

* cited by examiner

BELT DRIVE FOR DRIVING A MOTOR VEHICLE, IN PARTICULAR A MOTORCYCLE, AND MOTOR VEHICLE, IN PARTICULAR A MOTORCYCLE

BACKGROUND AND SUMMARY

This disclosure relates to a belt drive for driving a motor vehicle, in particular a motorized bike. Furthermore, the disclosure relates to a motor vehicle, in particular a motorized bike, having such a belt drive.

DE 196 31 507 A1 discloses a tensioning apparatus for a belt drive, having a cup-shaped belt pulley, for driving auxiliary units. A tensioning apparatus for a belt drive for driving auxiliary units is disclosed by EP 1 437 528 B1. Furthermore, a tensioning device for traction means for driving auxiliary units is known from EP 1 369 622 B1.

One problem addressed by the present disclosure is that of creating a belt drive and a motor vehicle such that a particularly advantageous drive of the motor vehicle can be realized.

A first aspect of the disclosure relates to a belt drive for driving a motor vehicle. As is explained in more detail in the following text, the belt drive is a traction drive and is configured to drive the motor vehicle as a whole, that is to say, to drive it along the ground when the motor vehicle is supported on the ground downwardly in the vehicle vertical direction. This means that the motor vehicle, in its completed state, has the belt drive and is able to be driven via the belt drive, that is to say, can be driven along any or the abovementioned ground, while or when the motor vehicle is supported on the ground downwardly in the vehicle vertical direction. The motor vehicle is preferably a motorized bike, in particular a motorcycle. For example, the motor vehicle in the form in particular of a motorized bike, more particularly of a motorcycle, has at least or very preferably exactly two vehicle wheels, also referred to simply as wheels, such that the motor vehicle, in particular the motorized bike, is preferably a two-wheeler. In particular, the motor vehicle is a single-track vehicle. Very particularly, the motor vehicle is a land vehicle. It is also conceivable for the motor vehicle to have at most or exactly three vehicle wheels, also referred to simply as wheels, such that the motor vehicle may be in the form for example of a trike or three-wheeler. The vehicle wheels of the motor vehicle are ground contact elements via which the motor vehicle is supported or able to be supported on the abovementioned ground downwardly in the vehicle vertical direction. If the motor vehicle is driven along the ground, by the motor vehicle being driven via the belt drive, while the motor vehicle is supported on the ground downwardly in the vehicle vertical direction via its ground contact elements, the ground contact elements (vehicle wheels) roll, in particular directly, on the ground. Furthermore, the motor vehicle, in its completed state, has at least or exactly one drive motor, via which the motor vehicle can be driven. The drive motor may be an internal combustion engine, in particular a reciprocating engine. Very particularly, however, the drive motor is an electric machine, which is able to be operated in particular in motor operation and thus as an electric motor. Thus, the motor vehicle may be for example a hybrid or electric vehicle, in particular a battery electric vehicle (BEV).

The belt drive has a first belt pulley, which is also referred to as first pulley. The belt pulley is able to be driven by the drive motor of the motor vehicle. To this end, for example, the first belt pulley is coupled or able to be coupled to the drive motor, in particular to a driveshaft of the drive motor, torque-transmittingly, in particular for conjoint rotation. In particular, the drive motor may provide, via its output shaft, torques for driving the motor vehicle and thus the first belt pulley. For example, the output shaft, in particular when the drive motor is in the form of an electric machine, is a shaft, also referred to as rotor shaft, of a rotor of the electric machine, which has for example the rotor and a stator. Via the stator, the rotor is able to be driven and, as a result, is rotatable relative to the stator about an output axis of rotation, also referred to as machine axis of rotation. In particular, it is conceivable for the first belt pulley to be arranged coaxially with the output shaft.

The belt drive furthermore has a belt. The belt is a traction belt which, by itself, that is to say considered separately, is nonrigid, that is to say flexible. Thus, the traction belt can transmit only tensile forces, but not compressive forces. The belt drive wraps at least partially around the first belt pulley, with the result that the belt is able to be driven by the first belt pulley, in particular by the first belt pulley being driven. In other words, if the first belt pulley is driven, in particular via the drive motor, the belt is driven via the belt pulley or first belt pulley as a result, such that the belt is driven or is able to be driven by the drive motor via the first belt pulley. The belt drive furthermore has a second belt pulley, which is also referred to as second pulley. The belt also wraps at least partially around the second belt pulley, with the result that the second belt pulley is able to be driven by the belt. Thus, the second belt pulley is able to be driven by the first belt pulley via the belt, such that the second belt pulley is able to be driven by the drive motor, in particular by the output shaft, via the belt and the first belt pulley. In particular, the first belt pulley is rotatable about a first belt pulley axis of rotation, in particular relative to a base of the motor vehicle. Thus, for example, the first belt pulley is able to be driven by the drive motor and is rotatable about the first belt pulley axis of rotation as a result. It is also conceivable for the second belt pulley to be rotatable about a second belt pulley axis of rotation, in particular relative to the base of the motor vehicle. In this case, provision is made in particular for the belt pulley axes of rotation to extend parallel to one another and to be spaced apart from one another. In particular, the belt wraps around the respective belt pulley about the respective belt pulley axis of rotation. As a result of the respective belt pulley being driven, the respective belt pulley is rotated, in particular relative to the base, about its respective belt pulley axis of rotation.

As a result of the second belt pulley being driven, at least or exactly one of the vehicle wheels of the motor vehicle is able to be driven, with the result that the motor vehicle as a whole is able to be driven. The vehicle wheel that is able to be driven as a result of the second belt pulley being driven is also referred to as drivable or driven wheel or as drivable or driven vehicle wheel. Where the following text refers to the vehicle wheel, this is understood to mean, unless specified otherwise, the vehicle wheel that is able to be driven via or by the second belt pulley. Thus, the vehicle wheel can be driven by the belt via the second belt pulley, such that the vehicle wheel can be driven by the drive motor, in particular by the output shaft, via the second belt pulley, the belt and the first belt pulley. As a result, the motor vehicle as a whole can be driven. In particular, it is conceivable for the vehicle wheel to be rotated or rotatable about a wheel axis of rotation relative to the base of the motor vehicle, in particular when the vehicle wheel is driven by the second belt pulley and thus by the belt drive. In this case, provision is made in particular for the wheel axis of rotation to extend for example parallel to the first belt pulley axis of rotation of the first belt pulley and to be spaced apart from the first belt pulley axis of rotation. In principle, it is conceivable for the wheel axis of rotation to extend parallel to the second belt pulley axis of rotation of the second belt pulley and to be spaced apart from the second belt pulley axis of rotation. However, it is conceivable, in particular, for the vehicle wheel to be arranged coaxially with the second belt pulley, such that the wheel axis of rotation coincides with the second belt pulley axis of rotation and vice versa. For example, the vehicle wheel is coupled or able to be coupled to the second belt pulley torque-transmittingly, in particular for conjoint rotation. Thus, it is possible, for example, for the respective torque provided by the drive motor in particular via its output shaft to be transmitted to the first belt pulley by the drive motor, in particular by the output shaft. The belt drive may provide respective, second torques, for example via the second belt pulley, these also being referred to as output torques and resulting from the respective, first torques that are provided by the drive motor in particular via the output shaft. In particular, the respective second torque can be transmitted to the vehicle wheel by the second belt pulley, in order to drive the vehicle wheel as a result.

The belt drive furthermore has at least one damping element, provided in addition to the belt pulleys and in addition to the belt drive, which is in direct contact with a strand of the belt such that, via the damping element, vibrations of the strand can be damped. As is well known, the strand is a part or branch of the circulating, in particular endless belt, wherein the strand extends in particular between the belt pulleys.

It is possible for a weight-, space- and cost-saving design of the belt drive to be realized, such that the vehicle wheel and thus the motor vehicle as a whole can be driven via the belt drive particularly advantageously and in particular efficiently. In addition, it is possible, as a result of vibrations of the strand and thus of the belt being able to be effectively and efficiently damped via the damping element, for a particularly advantageous noise behavior of the belt drive, and of the motor vehicle as a whole, to be brought about, such that the motor vehicle can be driven particularly advantageously. The following findings, in particular, underlie the disclosure: in tests with a vehicle equipped with a belt drive, increases in resonance in certain speed ranges made an acoustically negative impression. The cause of these was able to be attributed to the belt by the tests. In the belt drive according to the disclosure, it has now been possible for such negative and thus undesired noticeable acoustic problems to be avoided, since the strand, or the vibrations thereof, can be damped, or is damped, effectively and efficiently via the damping element. As a result, a particularly advantageous, in particular a virtually even tonality of the belt drive can be realized.

Preferably, the belt is a toothed belt, and so the belt drive is preferably a toothed-belt drive. As a result, a particularly advantageous drive of the motor vehicle can be brought about.

In a particular advantageous refinement of the disclosure, the belt drive has at least or exactly one tensioning device, provided in addition to the damping element, via which the belt is tensioned. As a result, separation of functions is able to be realized. In the separation of functions, the tensioning device is used to advantageously tension the belt. Damping of vibrations of the belt is not effected or is effected much less by the tensioning device than by the damping element. By contrast, the damping element is used to damp the strand, or vibrations of the strand, in order, as a result, to avoid excessive vibrations of the strand, wherein the damping element does not tension the belt or tensions it much less than the tensioning device.

Thus, it has been found to be particularly advantageous when the belt is tensioned more via the tensioning device than via the damping element. In particular, provision may be made for the damping element to not or not significantly tension the belt. In this regard, although, for example, the damping element is in contact with the strand and thus the belt, the damping element exerts at least virtually no force or only very little force, which could bring about tensioning of the belt, on the belt, such that, as it were, when the belt is driven, the damping element sweeps, as it were, only very lightly and gently over the belt. By contrast, the belt is actually tensioned or pretensioned, in particular compared with the damping element, via the tensioning device. Thus, it is possible to avoid a situation in which the damping element or the tensioning element is attributed a dual function which provides both damping of vibrations of the belt and tensioning of the belt. The findings underlying the disclosure in this regard are in particular that a belt, for example a toothed belt, is usually placed under pretension and thus tensioned as a rule either by increasing a spacing, also referred to as center distance, of the belt pulley axes of rotation or via a tensioning roller, wherein damping provided in addition thereto is not provided. Thus, the tensioned belt, in particular the tensioned belt strands thereof, can vibrate freely, similarly to a guitar string. Positionally fixed or spring-loaded tensioning rollers that are frequently used usually work in this case with a fairly high pressure force, necessary for tensioning the belt, and, as a result, ensure that a vibration node is formed at the tensioning roller and thus that the resonant frequencies of the belt are shifted. However, on account of their function, these tensioning rollers are subject to further requirements, for example with regard to dimensioning, positioning, wrap angle, and can therefore rarely be used for advantageously damping the belt and thus for acoustic optimization, since such a tensioning roller is usually attributed the above-described dual function, and consequently such a tensioning roller is used without additional damping.

If a strand, also referred to as belt strand, of a belt is excited in its eigenmode, for example by teeth of a pulley, polygon effect, etc., the vibration is amplified and therefore so is the sound radiation. This is clearly perceptible in the form of a higher volume in certain speed ranges by people such as the driver of the motor vehicle, for example, and is often considered unpleasant.

The disclosure now aims in particular to damp the tensioned strand via the damping element, wherein the strand is under tension in particular because the belt and thus the strand has been tensioned via the tensioning device provided in addition to the damping element. The strand is damped for example either such that the vibration amplitude is kept as low as possible uniformly across all speed ranges, or such that the resonant frequencies are shifted into driving states in which they are not perceived as disturbing. Advantageously, not just one but as many eigenmodes as possible are damped or shifted at the same time by the same damping element.

The damping element is positioned in this case as far as possible in a convexity of the vibration mode or vibration modes to be damped which would occur if the damping element were not provided, and under no circumstances at a vibration node. A force in the form for example of a pressure force, which the damping element exerts on the strand in order to damp the vibrations, is preferably low enough that no new vibration modes with nodal points form at the damping element.

A further embodiment is characterized in that the damping element is held on a lever arm which extends away in particular from the damping element and is held pivotably on a base element. The base element may be for example the abovementioned base or be a constituent part of the abovementioned base. In particular, the damping element is held on the lever arm such that the damping element is pivotable relative to the base element with the lever arm. Thus, it is conceivable in particular for the lever arm and thus in particular also the damping element to be pivotable about a pivot axis relative to the base element. Very preferably, provision is made for the pivot axis to extend parallel to the belt pulley axes of rotation and to be spaced apart from the belt pulley axes of rotation. Thus, it is conceivable in particular for the belt pulley to be rotatable about its respective belt pulley axis of rotation relative to the base element. Via the lever arm and via the damping element held therein, particularly advantageous damping of the strand, or of the vibrations, can be realized.

In order for it to be possible to realize particularly effective damping of the vibrations, or of the strand, provision is made, in a further refinement of the disclosure, for the lever arm to be supported on the base element via at least one spring element and to be pivotable relative to the base element counter to a spring force that is provided or able to be provided by the spring element. Preferably, the spring element is a mechanical spring element, and thus a solid body. For example, the spring element may be a torsion spring. Since, for example, the damping element is in direct contact with the strand, when the strand vibrates, the damping element and the lever arm are pivoted relative to the base element. As a result, the spring element is elastically deformed, with the result that the vibrations of the strand are effectively and efficiently damped.

In order for it to be possible to damp vibrations of the strand particularly advantageously and to realize a particularly efficient drive, provision is made, in a further refinement of the disclosure, for the damping element to be a roller. In particular, the roller is rotatable about a roller axis of rotation relative to the base because the roller axis of rotation extends for example parallel to the belt pulley axes of rotation and is spaced apart from the roller axes of rotation. In particular, the roller axis of rotation is spaced apart from the pivot axis, wherein the roller axis of rotation can extend parallel to the pivot axis. If the belt is driven, in particular via the first belt pulley, since the roller, also referred to as damping roller, is in direct contact with the strand and thus with the belt, the roller is rotated about its roller axis of rotation relative to the base element.

It has been found to be particularly advantageous in this case when the roller is held rotatably on the lever arm. As a result, vibrations of the strand can be damped in a particularly low-friction and efficient manner.

Finally, it has been found to be particularly advantageous when the damping element is a sliding rail on which the belt slides when the belt is driven and as a result is moved relative to the sliding rail.

For example, the roller can damp the strand, or the vibrations thereof, such that the roller is movably mounted, in particular rotatably held, in particular rotatably mounted, on the lever arm, and presses against or on the strand with an advantageously low force. This force results for example, in particular only, from the weight force of the damping element and/or the force results from the spring force or is brought about by the spring element. A damping effect of the damping element can be brought about for example by friction in a mechanism of the roller. A degree of freedom of movement of the roller can be embodied for example in rotation and/or linearly or in translation. As an alternative to the movably, in particular rotatably, mounted roller, which is movable in particular in that it is pivotable about the pivot axis relative to the base element by the lever arm, it is possible to use a positionally fixed, but elastic, that is to say elastically deformable, roller, which is formed for example from an elastomer. Thus, it is conceivable that, although the roller is, for example, rotatable about its roller axis of rotation relative to the base, it is otherwise held on the base so as to be immovable relative to the base, that is to say is not moved relative to the base by vibrations of the strand, but is deformed elastically by vibrations of the strand, with the result that the vibrations of the strand can be advantageously damped.

In particular, the belt has at least or exactly two strands, specifically the abovementioned strand, which is also referred to as first strand, and a second strand, which is located in particular opposite the first strand. The abovementioned damping element, also referred to as first damping element, damps for example vibrations of the first strand. In this case, it is conceivable for a second damping element, provided in addition to the damping element and in addition to the belt pulleys and in particular also in addition to the tensioning device, to be provided, via which vibrations of the second strand can be damped. In this case, the statements, given above and below, about the first damping element can be readily applied to the second damping element, too, and vice versa. If, for example, an aim is to shift the resonant frequency into less disturbing ranges, the following may apply: the pressure force with which the damping element presses against the strand should be selected to be higher, such that the damping element always bears or rests on the strand and thus the belt and a new vibration node is formed, in particular compared with the belt drive in which the damping element is not provided. As a result, the strand is divided as it were into two short partial strands, wherein a first of the partial strands extends between the first belt pulley and the damping element and a second of the partial strands extends between the damping element and the second belt pulley. The partial strands each have higher resonant frequencies than the strand as a whole. A positioning system of the damping element is in this case crucial for a desired shifting of the resonances, since the eigenfrequencies of a strand are anti-proportional to the freely vibrating length thereof.

Particularly preferably, the disclosure provides for a tension, in particular pretension, advantageous for operation of the belt drive, of the belt or on the belt to be brought about by some other device, provided in addition to the damping element, in the form of the abovementioned tensioning device. The tensioning device may have at least or exactly one tensioning roller, provided in addition to the damping element, via which the belt is tensioned more than via the damping element. Alternatively or in addition, it is possible for the tensioning device to be or to comprise a center distance changing device, via which, to tension the belt, a spacing of the belt pulley axes of rotation with respect to one another is variable or settable, this spacing also being referred to as center distance and extending perpendicularly to the belt pulley axes of rotation. In particular, the center distance is able to be increased via the center distance changing device, in order to tension the belt as a result. Since, preferably, the tensioning device provided in addition to the damping element is used to tension the belt, the damping element, also referred to as damper, can advantageously have small dimensions and no restrictions that apply to tensioning rollers, for example in terms of the wrap angle and position, need to be taken into consideration for the damping element. As a result, the damping element can be optimized for a desired acoustic effect, such that undesired vibrations of the strand and thus undesired noise can be advantageously avoided via the damping element.

A second aspect of the disclosure relates to a motor vehicle, preferably in the form of a motorized bike, in particular of a motorcycle, which is very preferably in the form of a two-wheeler or three-wheeler. The motor vehicle has a drive motor and at least one vehicle wheel. In particular, the motor vehicle has at least or exactly two vehicle wheels. In particular, the motor vehicle can have at most or exactly three vehicle wheels. The motor vehicle furthermore comprises a belt drive, configured to drive the motor vehicle, which has a first belt pulley that is able to be driven by the drive motor of the motor vehicle. The belt drive furthermore has a belt which wraps at least partially around the first belt pulley and is able to be driven by the first belt pulley as a result. Furthermore, the belt drive comprises a second belt pulley around which the belt wraps at least partially and which is able to be driven by the belt as a result, with the result that the at least one vehicle wheel, in particular at least or exactly one of the vehicle wheels of the motor vehicle, is able to be driven via the second belt pulley, with the result that the motor vehicle as a whole can be driven. Furthermore, the belt drive comprises at least one damping element, in direct contact with a strand of the belt, for damping vibrations of the strand. Advantages and advantageous refinements of the first aspect of the disclosure should be considered to be advantages and advantageous refinements of the second aspect of the disclosure, and vice versa.

Finally, it has been found to be particularly advantageous when the motor vehicle is in the form of a motorized bike which has at most or exactly three vehicle wheels, in particular exactly two vehicle wheels, wherein at least or exactly one of the vehicle wheels of the motor vehicle is able to be driven by the belt via the second belt pulley and thus via the belt drive, with the result that the motor vehicle is able to be driven.

BRIEF DESCRIPTION OF THE DRAWINGS

Further details of the disclosure will become apparent from the following description of a preferred exemplary embodiment together with the associated drawings.

In the figures, identical or functionally identical elements have been provided with the same reference signs.

DETAILED DESCRIPTION OF THE DRAWINGS

Figure 1:
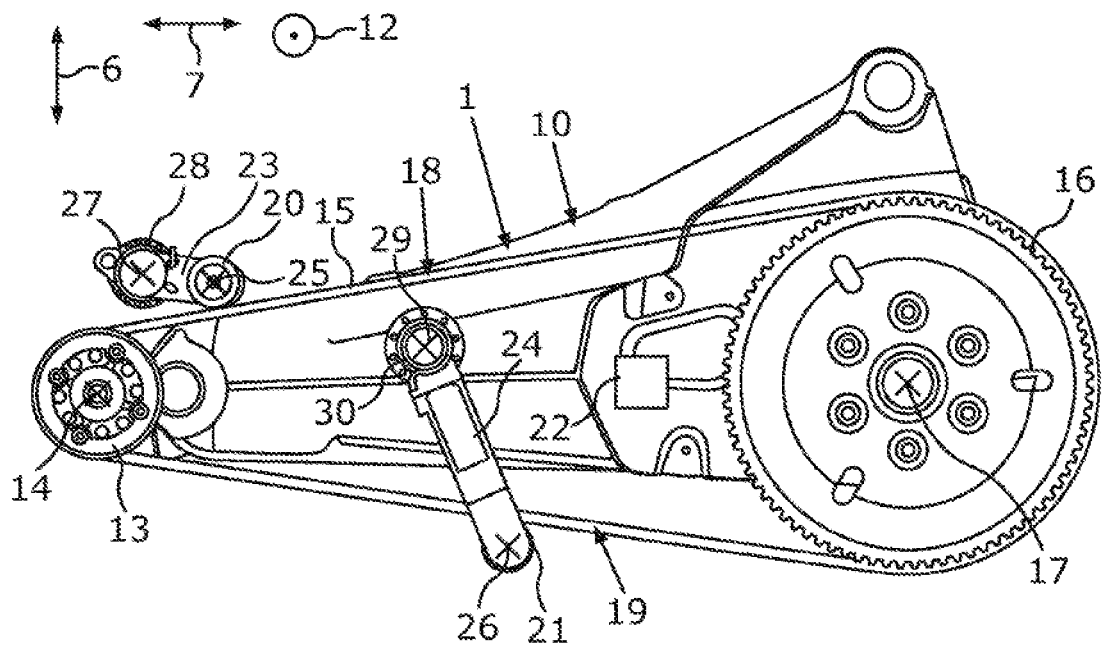
FIG. 1 shows a schematic side view of a belt drive for a motor vehicle in the form of a motorized bike.
Figure 3:
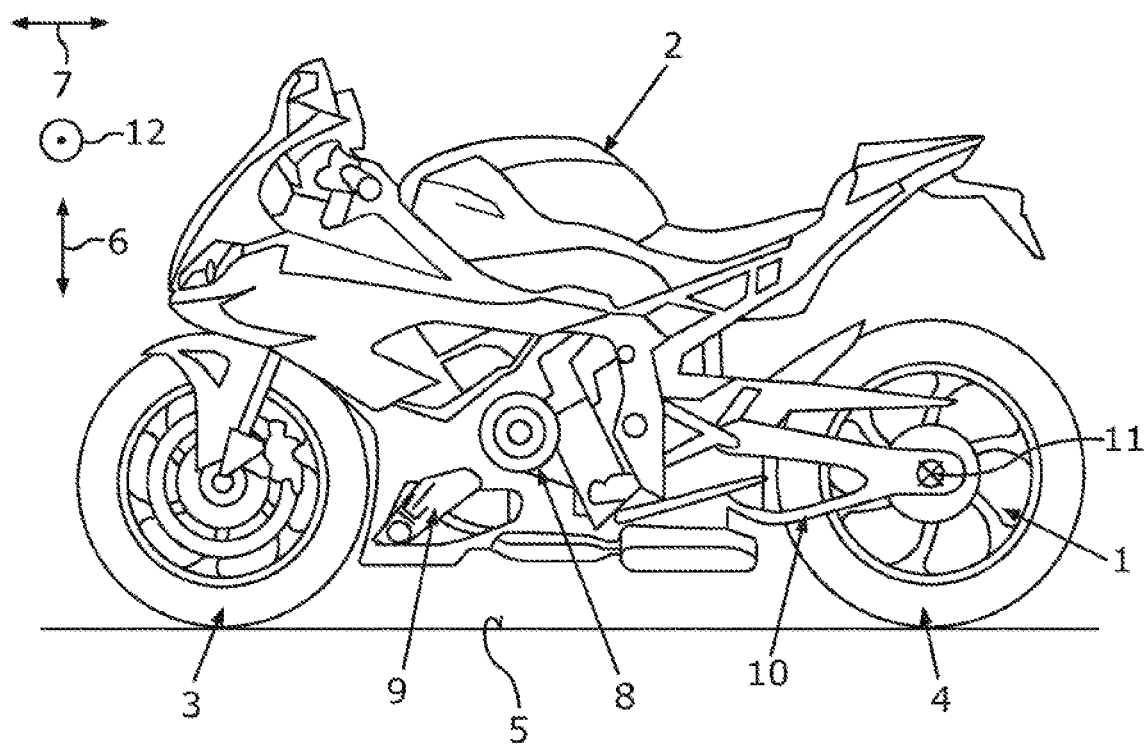
FIG. 3 shows a schematic side view of the motor vehicle, which is in the form of a motorcycle.

FIG. 1 shows a schematic side view of a belt drive 1 for driving a motor vehicle that is shown in a schematic side view in FIG. 3 and is in the form of a motorized bike 2. In the exemplary embodiment shown in the figures, the motorized bike 2 is in the form of a motorcycle, and so the motor vehicle is a single-track land vehicle. The motorized bike 2 has exactly two vehicle wheels, specifically a first vehicle wheel 3 as front wheel and a second vehicle wheel 4 as rear wheel. It is apparent from FIG. 3 that the vehicle wheels 3 and 4 are ground contact elements, via which the motor vehicle (motorized bike 2) is supported or able to be supported on in particular at least substantially horizontal ground 5 downwardly in the vehicle vertical direction. In this case, the vehicle wheels 3 and 4 are in direct contact with the ground 5. The vehicle vertical direction is indicated by a double arrow 6. The vehicle wheels 3 and 4 are arranged in succession in the vehicle longitudinal direction of the motorized bike 2, wherein the vehicle longitudinal direction is indicated by a double arrow 7.

The motorized bike 2 has a drive motor 8, in particular exactly one drive motor 8, which may be in the form of an internal combustion engine or of an electric machine. The drive motor 8 has an output shaft, via which the drive motor 8 can provide torques, which are also referred to as drive torques, wherein the motor vehicle (motorized bike 2) can be driven via the respective drive torque. For example, the motorized bike 2 has a chassis 9, which may be in the form, for example, of a frame, in particular of a ladder frame. The drive motor 8 may be a constituent part of the chassis 9 or be held on the chassis 9. The motorized bike 2 also has a base element, also referred to as base, which is in the form of a so-called swing arm 10 in the exemplary embodiment shown in the figures. The vehicle wheel 4 in the form of a rear wheel is held rotatably on the swing arm 10, and so the swing arm 10 is a rear wheel swing arm in the present case. In particular, the rear vehicle wheel 4 is held on the swing arm 10 so as to be rotatable about a wheel axis of rotation 11 relative to the swing arm 10. The swing arm 10 and, together with the swing arm 10, the vehicle wheel 4 are pivotable about a swing arm pivot axis relative to the chassis 9, wherein, for example, the swing arm pivot axis extends in the vehicle transverse direction, in other words parallel to the vehicle transverse direction. The vehicle transverse direction is indicated by a double arrow 12. The wheel axis of rotation 11 extends for example in the vehicle transverse direction, in other words parallel to the vehicle transverse direction. The swing arm pivot axis and the wheel axis of rotation 11 are spaced apart from one another for example in the vehicle longitudinal direction and extend parallel to one another.

The belt drive 1 has a first belt pulley 13, which is able to be driven by the drive motor 8 and is rotatable about a first belt pulley axis of rotation 14 relative to the base element as a result. In particular, the first belt pulley axis of rotation 14 extends in the vehicle transverse direction, in other words parallel to the vehicle transverse direction. For example, the first belt pulley 13 is connected or able to be connected, in other words coupled or able to be coupled, to the output shaft torque-transmittingly, in particular for conjoint rotation. For example, the belt pulley 13 is arranged coaxially with the output shaft. In particular, it is conceivable for the belt pulley 13 to be held on the chassis 9 so as to be rotatable about the belt pulley axis of rotation 14 relative to the chassis 9, such that the swing arm 10 can be pivoted about the swing arm pivot axis relative to the belt pulley 13. In this case, provision is made in particular for the swing arm pivot axis and the belt pulley axis of rotation 14 to be spaced apart from one another and to extend for example parallel to one another.

The belt drive 1 also has a traction belt in the form of a belt 15. In the exemplary embodiment shown in the figures, the belt 15 is thus a toothed belt, and so the belt drive 1 is a toothed-belt drive. The belt 15 wraps around the belt pulley 13 at least partially, in particular about the belt pulley axis of rotation 14, and so the belt 15 is able to be driven by the belt pulley 13 being driven, in other words as a result of the belt pulley 13 being rotated about the belt pulley axis of rotation 14 relative to the swing arm 10 and in particular also relative to the chassis 9. Thus, the belt 15 is able to be driven by the drive motor, and thus by the output shaft, via the belt pulley 13.

The belt drive 1 furthermore comprises a second belt pulley 16, which is rotatable about a second belt pulley axis of rotation 17 relative to the swing arm 10 and also relative to the chassis 9. In this case, the belt pulley 16 is held on the swing arm 10 so as to be rotatable about the belt pulley axis of rotation 17 relative to the swing arm 10. Thus, the belt pulley 16 is pivotable together with the swing arm 10 about the swing arm pivot axis relative to the chassis 9. The belt 15 wraps around the belt pulley 16 at least partially, in particular about the belt pulley axis of rotation 17, such that the belt pulley 16 is able to be driven by the belt 15 being driven and is thus rotatable about the belt pulley axis of rotation 17 relative to the swing arm 10 and also relative to the chassis 9. As a result of the belt pulley 16 being driven, that is to say as a result of the belt pulley 16 being rotated about the belt pulley axis of rotation 17 relative to the swing arm 10, the vehicle wheel 4 is able to be driven, with the result that the motor vehicle (motorized bike 2) as a whole is able to be driven. In this case, it is conceivable for the belt pulley 16 and the vehicle wheel 4 to be arranged coaxially with one another, such that the wheel axis of rotation 11 coincides with the belt pulley axis of rotation 17. Alternatively, it would be conceivable for the wheel axis of rotation 11 and the belt pulley axis of rotation 17 to be spaced apart from one another, in particular in the vehicle longitudinal direction, and in particular to extend parallel to one another. In particular, provision is made for the belt pulley axes of rotation 14 and 17 to be spaced apart from one another at least in the vehicle longitudinal direction and to extend parallel to one another. It is apparent that the belt pulley 13 has a first diameter, in particular a first outside diameter, wherein the belt pulley 16 has a second diameter, in particular a second outside diameter, wherein the second outside diameter is greater than the first outside diameter. Therefore, the belt pulley 13 is also referred to as a belt sprocket and the belt pulley 16 is also referred to as a belt wheel. The belt 15 has a first toothing facing the belt pulleys 13 and 16, wherein the respective belt pulleys 13, 16 have respective second toothings. Teeth of the first toothing engage in corresponding tooth gaps of the respective second toothing, and teeth of the respective second toothing engage in tooth gaps of the first toothing, with the result that the belt 15 is connected to the belt pulleys 13 and 16 torque- and force-transmittingly. As a result, the belt pulley 16 can be driven by the belt pulley 13 via the belt 15.

A first strand of the belt 15, which is an upper strand in the vehicle vertical direction and extends between the belt pulleys 13, 16, bears the reference sign 18. A second strand of the belt 15, which is a lower strand in the vehicle vertical direction, is located opposite the first strand 18, in particular in the vehicle vertical direction, and extends between the belt pulleys 13 and 16, bears the reference sign 19.

The upper strand 18 of the belt 15 is assigned a first damping element 20, in particular exactly one first damping element 20, which is in the form of a first roller in the exemplary embodiment shown in the figures. The first roller is also referred to as first damping roller. The strand 19 is assigned a second damping element 21, in particular exactly one second damping element 21, which is in the form of a second roller, also referred to as second damping roller, in the exemplary embodiment shown in the figures. The first damping roller is in direct contact with the strand 18, and the second damping roller is in direct contact with the strand 19, such that when the belt 15 is driven, the damping rollers roll, in particular directly, on the belt 15. As is explained in more detail in the following text, vibrations of the strand 18 are intended to be damped via the first damping roller and vibrations of the strand 19 are intended to be damped via the second damping roller.

The belt drive 1 furthermore has at least or exactly one tensioning device 22, which is illustrated particularly schematically in FIG. 1 and is provided in addition to the damping elements 20 and 21, the belt 15 and thus the strands 18 and 19 being tensioned via the tensioning device 22. The damping rollers exert no or only very little force, also referred to as pressure force, on the belt 15, at any rate to such an extent that the belt 15 and thus the strands 18 and 19 are tensioned more via the tensioning device 22 than via the damping elements 20 and 21, in particular both when the damping elements 20 and 21 are considered together and when the damping elements 20 and 21 are respectively considered separately. In other words, both compared with the damping elements 20 and 21 considered together and compared with damping element 20, 21 considered respectively individually and thus separately, the tensioning device 22 tensions the belt 15 much more, and so the damping elements 20 and 21 do not provide significant tensioning of the belt 15 either when considered respectively separately or when considered together. As a result, restrictions that usually need to be taken into consideration for tensioning devices, such as tensioning rollers for example, can be disregarded for the damping elements 20 and 21, and so the vibrations of the strands 18 and 19 can be damped particularly advantageously via the damping elements 20 and 21, in particular such that undesired noise can be avoided and thus a particularly advantageous noise behavior of the belt drive 1 and thus of the motorized bike 2 as a whole can be brought about.

Each respective damping roller is held rotatably on a respectively associated lever arm 23, 24. In the present case, the damping element 20 is held on the lever arm 23 so as to be rotatable about a first roller axis of rotation 25 relative to the lever arm 23. The damping element 21 is held on the lever arm 24 so as to be rotatable about a second roller axis of rotation 26 relative to the lever arm 24. The roller axes of rotation 25, 26 extend parallel to one another and are spaced apart from one another. Furthermore, each respective roller axis of rotation 25, 26, for example, extends in the vehicle transverse direction, in other words parallel to the vehicle transverse direction (double arrow 12). The lever arm 23 is held on a base element 28 so as to be pivotable about a first lever arm pivot axis 27 relative to the swing arm 10 and also relative to the chassis 9. The base element 28 is for example the swing arm 10 or the chassis 9, or the base element 28 is formed separately from the swing arm 10 and/or separately from the chassis 9 and is held on the swing arm 10 and/or on the chassis 9, in the present case on the chassis 9. It is particularly clearly apparent from FIG. 2 that, in the exemplary embodiment shown in the figures, the base element 28 is in the form of a plate, also referred to as support plate.

The lever arm 24 is held on a second base element 30 so as to be pivotable about a second lever arm pivot axis 29 relative to the swing arm 10 or relative to the chassis 9. The base element 30 may be the base element 28, or the base elements 28 and 30 may be formed in one piece with one another. Thus, the base element 30 may be the swing arm 10 or the chassis 9, or the base element 30 is formed separately from the swing arm 10 and/or separately from the chassis 9 and is held on the swing arm 10 or on the chassis 9, in the present case on the swing arm 10.

The statements, given above and below, about the damping element 20, the lever arm 23 and the base element 28 can be applied to the damping element 21, the lever arm 24 and the base element 30, too, and vice versa.

Figure 2:
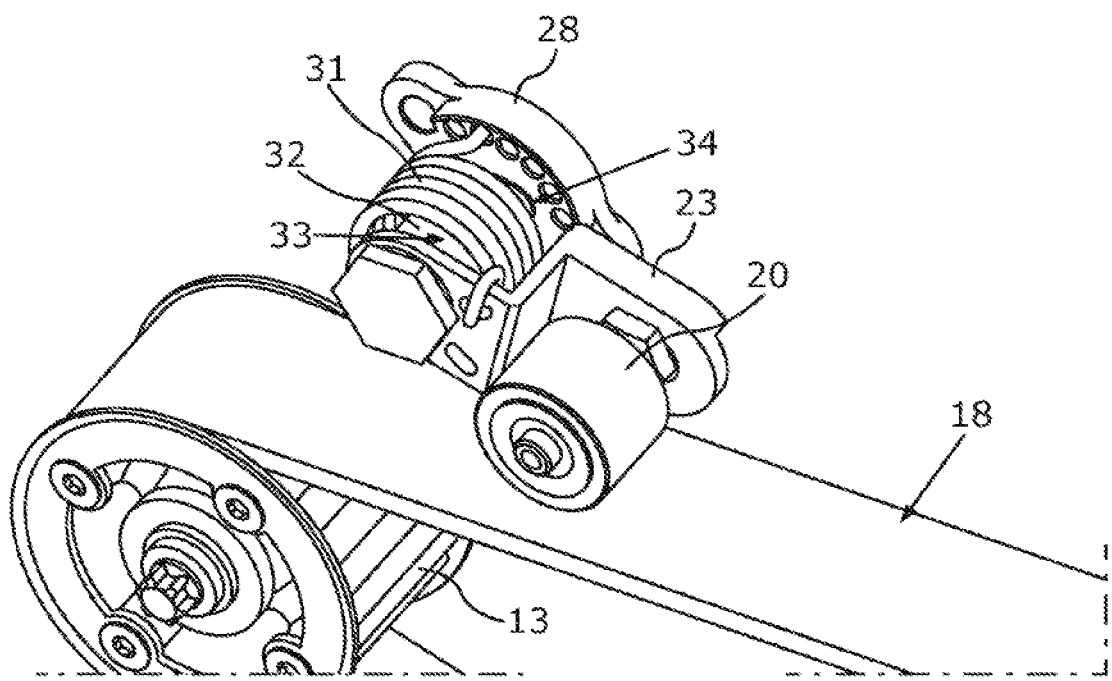
FIG. 2 shows, as a detail, a schematic perspective view of the belt drive.

It is particularly readily apparent from FIG. 2 that the lever arm 23 is supported on the base element 28 via a mechanical spring element 31, which is in the form, for example, of a torsion spring, and is thus pivotable about the lever arm pivot axis 27 relative to the base element 28 counter to a spring force that is provided or able to be provided by the spring element 31. The base element 28 has a bearing element 32, in the form for example of a bearing pin, on which the lever arm 23 is mounted so as to be pivotable about the lever arm pivot axis 27 relative to the bearing element 32, in particular via a plain bearing 33, such that it is possible to ensure low-friction and cost-effective mounting of the lever arm 23 on the bearing element 32. As seen in particular along the lever arm pivot axis 27 and thus in the axial direction of the spring element 31, a friction element 34, such as a wave spring for example, is arranged for example between the spring element 31 and the base element 28, advantageous friction being able to be generated via the wave spring, in particular between the spring element 31 and the base element 28 and/or between the lever arm 23 and the base element 28 and/or between the spring element 31 and the lever arm 23. As a result of vibrations of the strand 18, the lever arm 23 and, together therewith, the damping element 20 are pivoted about the lever arm pivot axis 27 relative to the base element 28, with the result that the spring element 31 is elastically deformed. As a result of this and/or as a result of the abovementioned friction, which occurs when the lever arm 23 and, together therewith, the damping element 20 are pivoted about the lever arm pivot axis 27 relative to the base element 28, the vibrations of the strand 18 are advantageously damped. As a result, a particularly advantageous noise behavior of the belt drive 1 and thus of the motorized bike 2 as a whole can be ensured.

What is claimed is:

1. A belt drive for driving a motor vehicle, comprising:
   a first belt pulley that is able to be driven by a drive motor of the motor vehicle,
   a belt which wraps at least partially around the first belt pulley and is able to be driven by the first belt pulley as a result,
   a second belt pulley around which the belt wraps at least partially and which is able to be driven by the belt, with the result that, via the second belt pulley, a vehicle wheel of the motor vehicle and the motor vehicle are able to be driven by the belt drive,
   at least one damping element, in direct contact with a strand of the belt, for damping vibrations of the strand, and
   at least one tensioning device, provided in addition to the damping element, via which the belt is tensioned,
   wherein the belt is tensioned more via the tensioning device than via the damping element.

2. The belt drive according to claim 1, wherein:
   the damping element is held on a lever arm which is held pivotably on a base element of the belt drive.

3. The belt drive according to claim 2, wherein:
   the lever arm is supported on the base element via at least one spring element and is pivotable relative to the base element counter to a spring force that is provided or able to be provided by the spring element.

4. The belt drive according to claim 1, wherein:
   the damping element is a roller.

5. The belt drive according to claim 4, wherein:
   the roller is held rotatably on the lever arm.

6. The belt drive according to claim 1, wherein:
   the damping element is a sliding rail.

7. A motor vehicle comprising:
   a drive motor,
   at least one vehicle wheel, and
   a belt drive configured to drive the motor vehicle, the belt drive comprising:
   a first belt pulley that is able to be driven by the drive motor of the motor vehicle,
   a belt which wraps at least partially around the first belt pulley and is able to be driven by the first belt pulley,
   a second belt pulley around which the belt wraps at least partially and which is able to be driven by the belt, with the result that, via the second belt pulley, the vehicle wheel of the motor vehicle and the motor vehicle are able to be driven,
   at least one damping element, in direct contact with a strand of the belt, for damping vibrations of the strand, and
   at least one tensioning device, provided in addition to the damping element, via which the belt is tensioned,
   wherein the belt is tensioned more via the tensioning device than via the damping element.

8. The motor vehicle according to claim 7, wherein:
   the motor vehicle is in the form of a motorized bike which has at most or exactly two vehicle wheels, wherein at least one of the vehicle wheels of the motor vehicle is able to be driven by means of the belt drive via the second belt pulley, with the result that the motor vehicle is able to be driven.

9. The motor vehicle according to claim 7, wherein:
   the motor vehicle is in the form of a motorized bike which has at most or exactly three vehicle wheels, wherein at least one of the vehicle wheels of the motor vehicle is able to be driven by means of the belt drive via the second belt pulley, with the result that the motor vehicle is able to be driven.

* * * * *